United States Patent [19]
Makowski et al.

[11] 3,927,143
[45] Dec. 16, 1975

[54] THERMOPLASTIC BLOCK COPOLYMERS

[75] Inventors: Henry S. Makowski, Scotch Plains; Donald J. Buckley, Sr., Plainfield, both of N.J.

[73] Assignee: Exxon Research & Engineering Co., Linden, N.J.

[22] Filed: Oct. 12, 1973

[21] Appl. No.: 405,920

[52] U.S. Cl... 260/886; 260/31.8 HR; 260/33.6 UA
[51] Int. Cl.$^2$.....................C08L 25/08; C08L 25/16; C08K 5/01;C08K 5/12
[58] Field of Search..................... 260/886

[56] References Cited
UNITED STATES PATENTS

| | | | |
|---|---|---|---|
| 3,459,832 | 8/1969 | Kern | 260/886 |
| 3,734,978 | 5/1973 | Schwab | 260/886 |
| 3,770,712 | 11/1973 | Schwab | 260/886 |
| 3,786,116 | 1/1974 | Milkovich | 260/886 |

*Primary Examiner*—Murray Tillman
*Assistant Examiner*—Thurman K. Page
*Attorney, Agent, or Firm*—Robert J. Baran; Joseph J. Allocca

[57] ABSTRACT

Novel thermoplastic copolymers are described wherein said copolymer is selected from the group consisting of block copolymers having the general formulae (I) A—B—A, (II) A—B—A—B—A, (III) xB—[A—B]$_n$—yA and graft copolymers having the general formula

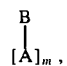

wherein $m$ and $n$ are integers greater than or equal to 2; $x$ and $y$ are 0 or 1, and $y$ is 0 when $n$ is 2; and A and B are mutually incompatible thermoplastic polymer blocks having a solubility parameter difference of 0.7, preferably 1.0 and greater. The A and B polymer blocks are prepared from vinyl aromatics and have a molecular weight of at least 5000 and a glass transition temperature of at least 35°C. The copolymers of the instant invention may be compounded with from 25 to 300 parts per hundred plasticizer to prepare flexible compositions and can be used to fabricate articles with novel properties. The most preferred compositions are ABA type copolymers, e.g., styrene-t-butyl styrene-styrene.

27 Claims, No Drawings

THERMOPLASTIC BLOCK COPOLYMERS

BACKGROUND OF THE INVENTION

1. Field of the Invention

Novel thermoplastic copolymers are described wherein said copolymer is selected from the group consisting of block copolymers having the general formulae (I) A—B—A, (II) A—B—A—B—A, (III) $xB$—$[A$—$B]_n$—$yA$ and graft copolymers having the general formula

wherein $m$ and $n$ are integers greater than or equal to 2; $x$ and $y$ are 0 or 1, and $y$ is 0 when $n$ is 2; and A and B are mutually incompatible thermoplastic polymer blocks having a solubility parameter difference of 0.7, preferably 1.0 and greater. The A and B polymer blocks are prepared from vinyl aromatics and have a molecular weight of at least 5000 and a glass transition temperature of at least 35°C. The copolymers of the instant invention may be compounded with from 25 to 300 parts per hundred plasticizer to prepare flexible compositions and can be used to fabricate articles with novel properties. The most preferred compositions are A—B—A type copolymers, e.g., styrene-t-butyl styrene-styrene.

2. Summary of the Prior Art

Block copolymers of vinyl aromatics are known in the art. For example, see "*Kobunshi Kagaku* 17, 641–3 (1960)," wherein block copolymers of styrene and α-methylstyrene are taught. However, the compositions of the reference unlike those of the instant invention cannot be compounded with large amounts of plasticizer to prepare tough, flexible compositions since solubility parameter differences of styrene and α-methylstyrene are insufficient to allow the preferential plasticization of only one polymer block.

SUMMARY OF THE INVENTION

Novel thermoplastic block copolymers are disclosed wherein said copolymer is selected from the group consisting of copolymers having the general formulae
I. A—B—A
II. A—B—A—B—A
III. $xB$—$[A$—$B]_n$—$yA$;
and graft copolymers having the general formula

wherein $n$ and $m$ are integers greater than or equal to 2; and $x$ and $y$ are 0 or 1; and $y$ is 0 when $n$ is 2; and A and B are mutually incompatible thermoplastic polymer segments. The incompatible phases which result from such block systems are substantially amorphous glasses, i.e., phases containing less than 5% crystallinity. Block copolymers according to Formula III which contain one or even two end blocks composed of B-segments are within the scope of this invention provided the end block B-segments do not exceed 35% by weight of the total amount of B-segments present in the copolymer. Thus, for example, copolymers represented by the general formulae aA—bB—aA—bB—aA—bB and bB—(aA—bB)$_5$ where $\Sigma a + \Sigma b = 100$ are contemplated even though they contain one and two end B-blocks, respectively. In any case, however, the most preferred block copolymers are those devoid of any end B-blocks.

The thermoplastic polymer blocks each have a softening point of at least 35°C., and more preferably at least 50°C. The individual polymer blocks are chosen so that their solubility parameter difference will be greater than 0.70, and preferably greater than 1.0. Thus, the copolymers of the instant invention are characterized as multiphase, e.g., A will exist as discontinuous microphases in a continuous B phase. It should be noted that in any reference to solubility parameter given below, the value at 25°C. is intended.

Solubility parameter is a term which has been widely employed to characterize quantitatively the polar characteristics of liquids and polymers. Small (*J. App. Chem.*, 3, 71 (1953)) first employed this approach quantitatively to ascertain the solvent power of certain diluents for selected polymers and demonstrated the predictive capability of this tool. A rather complete list of solubility parameters for various liquids and polymers is found in the Polymer Handbook, Edited by Brandrup and Immergut, Wiley & Sons, 1966, p. IV - 341 to IV - 368. A summary of the utility of solubility parameters is also provided therein. It is also described how the solubility parameter can be calculated for those polymers and liquids for which values have not yet been determined.

With the information now available in the literature, it is feasible to determine solubility parameters for nearly any polymer block which can be prepared. We have observed that in the case of block copolymers, it is essential that the solubility parameters of the blocks be sufficiently different (at least 0.70 units and preferably greater than 1.0 units) in order to effect the desired phase separation of the polymer blocks required in this invention.

Thus, this invention teaches this critical difference in solubility parameter for the products to have any merit. There is no upper limit to this difference in solubility parameter of the various polymer phases, however practically one does not normally encounter polymer blocks which possess a solubility parameter difference of more than 4 or 5 units. Indeed, if the difference in solubility parameter between two polymer blocks is greater than 5 units, one finds that the polymer blocks are so imcompatible it may be difficult to create the block copolymers using the preparative chemistry discussed herein.

The criteria above clearly delineate what polymer blocks can be combined to create an acceptable phase separated block copolymer.

The thermoplastic blocks which comprise the graft and block copolymers of this invention may be chosen with reference to any known table on solubility parameters for polymers.

The copolymers described herein can be constituted in different ways in order that the copolymer may serve a different function. In one method of constitution the polymeric blocks are so disposed that the A block is the higher softening block. This permits a novel fabrication process as disclosed in copending application Ser. No. 199,799, filed Nov. 17, 1971, in the names of R. D. Lundberg and H. S. Makowski and hereby incorporated by reference. Thus, for example, a poly-t-butyl-styrene-polystyrene-poly-t-butylstyrene block copolymer with end blocks possessing a softening point of about 140°C. and the middle block possessing a softening point of about 100°C. would be useful in this fabrication process.

In another method of constitution the polymeric blocks are so disposed that the B block may be selectively plasticized to form flexible high strength plastics as disclosed in application Ser. No. 401,626, filed in the names of H. S. Makowski and R. D. Lundberg, and now U.S. Pat. No. 3,821,148, which is hereby incorporated by reference. Thus, for example, a polystyrene-poly-t-butylstyrene-polystyrene block copolymer can be selectively plasticized through the middle block utilizing such plasticizers as aliphatic oils and ditridecyl phthalate.

Representative examples of copolymers which are suitable for use in the instant invention provided they fall within the above-defined general formulae are: poly-t-butylstyrene-polystyrene, polychlorostyrenepolystyrene, poly-t-butylstyrene-polyvinyl toluene, poly-t-butylstyrene-poly-α-methyl styrene.

For reasons of economics and general utility, those multiphase thermoplastics which incorporate (polystyrene) blocks are most preferred. Those systems involving polystyrene blocks can be compounded with a wide range of nonvolatile plasticizers to prepare flexible products having excellent physical characteristics. Alternatively, polymer blocks based on poly-t-butylstyrene are desirable because these polymer blocks, on the other hand, possess a reasonably high (ca 140°C.) softening point and, on the other hand, are readily solvated by nonvolatile, inexpensive oils of an aliphatic composition. The availability and low cost of these oils, therefore, can provide plasticized systems of good properties and low cost. Each of these polymer blocks based on different aromatic monomers (for example, styrene and t-butyl styrene) will be solvated by different types of plasticizers and provide greatly different properties suitable for different applications.

The thermoplastic block copolymers of the instant invention may be prepared by either of two well-known polymerization techniques: (1) the preparation of terminally functional polymers followed by condensation reactions, or (2) addition polymerization during which one monomer is added and completely polymerized and then another added until the desired number of blocks are obtained. In the case of the terminally functional polymers preparative techniques for these polymer blocks are well known (see, for example, *Preparative Techniques of Polymer Chemistry*, Sorenson and Campbell, Interscience Publishers, 1968), and the means of combining these various blocks with each other is now well known in the polymer art. The condensation of terminally functional polymers results in block copolymers generally described by Formula III.

The A—B—A and A—B—A—B—A block copolymers are desirable copolymers which can be prepared through strict addition polymerization involving anionic initiators. The anionic initiators can be monofunctional, such as butyllithium, in which case mutliblock copolymers can be prepared by either of two methods: (1) addition and complete polymerization alternately of A monomers and B monomers until the desired number of blocks have been obtained, and (2) preparation of one-half of the copolymer molecule by addition polymerization followed by coupling of the reactive carbon-metal chain ends with reagents such as chlorosilanes, ethylene dibromide, 1,4-bis-chloromethylbenzene, dimethyl terephthalate, and the like. Difunctional initiators, such as those derived from sodium or lithium naphthalene, can be used in which case the middle blocks are polymerized first and the end blocks, polymerized last.

In the preparation of block copolymers via organolithium or organosodium initiators, preferred solvents are the aromatic solvents, such as benzene, toluene, etc., for the monofunctional initiators. For the difunctional initiators ethers are the preferred solvents, such as tetrahydrofuran, anisole, etc., although mixtures of ethers with aromatic solvents are operable.

The block copolymers of this invention can be prepared at temperatures of from −70°C. to 125°C. The optimum temperatures will depend on the initiator used and the solvent system. For example, with alkyllithiums in benzene solvent, polymerization is rapid and easily controlled at 50°–60°C.

Preferably A—B—A and A—B—A—B—A block copolymers are prepared so that they are substantially free of either homopolymer, A or B, and A—B diblocks. The presence of homopolymer A is least harmful and up to about 30% by weight can be tolerated. Homopolymer B functions much as a diluent, and up to 20% by weight can be tolerated to produce systems with good physical properties. The presence of A—B diblocks is most deleterious and, for plasticization to result in good properties, the amount of A—B diblock cannot exceed 10% by weight. In all cases the total amount of homopolymer and diblock impurities is most preferably less than 10 weight %. The novel copolymers of the instant invention specifically exclude random or statistical copolymers because they do not provide the desired phase separated products.

The polymer blocks of the instant invention will individually have a molecular weight of at least 5000, more preferably 10,000. In general, the A and B blocks may be combined in all weight ratios. However, preferably the B block will comprise from 50 to 95 weight % of said thermoplastic block copolymer. The most preferred thermoplastic copolymer types used in the instant invention may be represented by the general formula A—B—A, wherein A and B are as defined above. In this preferred copolymer the B block will comprise from 45 to 90 weight % of said total copolymer, more preferably from 50 to 80 weight %.

The preferred thermoplastic block copolymers of the instant invention are the A—B—A type vinyl aromatic. Block copolymers of styrene or α-methylstyrene and alkyl styrenes are preferred vinyl aromatic copolymers. These block copolymers not only can be selectively plasticized and fabricated in a useful and novel manner but also possess improved mechanical properties over those of the corresponding homopolymers and over those of physical blends of the corresponding homopolymers.

The alkyl styrenes of this invention are described by the formula

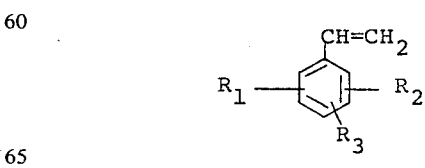

where $R_1$, $R_2$ and $R_3$ are hydrogen or alkyl groups such as methyl, ethyl, isopropyl, t-butyl, etc. In dialkylstyrenes ($R_3$=H) the alkyl groups are preferably ethyl and higher. In monoalkylbenzenes ($R_2$=$R_3$=H), which are preferred within the scope of the instant invention, the alkyl group is preferably propyl and higher, e.g., a $C_3$ to $C_{10}$ alkyl group. Where applicable, the alkyl groups can be normal, secondary, tertiary, or iso. The alkyl groups can also be alicyclics such as cyclopentyl and cyclohexyl. The position of substitution on the benzene ring is not critical, although alkyl styrenes possessing no ortho substituents are most desirable. Preferably, $R_1$, $R_2$ and $R_3$, individually, will have no more than 10 carbon atoms.

Monomers which are useful for preparing said vinyl aromatic polymer blocks include styrene, t-butyl styrene, p-vinyl-toluene and α-methylstyrene. By use of vinylaromatic polymeric blocks, compositions loaded with high amounts of plasticizer and having good polymer properties may be prepared. For example, hydrocarbon oil type plasticizers may be conveniently used with block copolymers wherein styrene comprises the A block and t-butyl styrene comprises the B block. These systems are novel oil-extended plastics and retain properties which are equivalent to more expensive materials while being characterized as being more economical. Oil extended styrene-t-butyl styrene-styrene block copolymers, may be formulated wherein the hydrocarbon oil extent will comprise up to 70% by weight of said total composition. As further described below, compositions of this sort will still retain good polymer toughness, i.e., elongation plus tensile strength.

By the use of vinylaromatic blocks useful articles can be obtained by means of a novel fabrication process. For example, with the graft or block copolymers described herein, useful fabricated articles are obtained when poly-t-butylstyrene is the A block and polystyrene is the B block. The fabrication of the final article comprises the following steps. The multiphase copolymer is first heated to a temperature above the softening point of both polymer blocks. Preferably, this temperature should be at least 10°C., and most preferably at least about 20°C., above that of the softening point of the higher softening block. At this temperature the copolymer is in a molten state and may be readily molded to any desired form. Thus, for example, the composition may be foamed, pressed into a sheet, blow molded to form a container such as a bottle, etc. After the article has been formed in the desired shape, it is then cooled to a temperature between that of the softening point of the A and B blocks and re-formed to a second desired shape. For example, if the first desired shape is a rigid foam, the second desired shape may be a flat sheet. After the article is reformed in the second desired shape, it is cooled to a temperature below both softening points while retaining this new desired shape. At any later time the re-formed article may be reheated to a temperature between the softening points of the A and B blocks and at this temperature will regain the first desired shape. For example, a sheet may be reheated to this temperature and expand to a rigid foam which was the first desired shape.

It is to be noted that where plasticized compositions are required we have generally required block or graft copolymers wherein the B block comprises at least 30% of the total polymer and most preferably 50%. The reason for this is that when the B block is plasticized the resulting plasticized phase should constitute the continuous phase. This will generally occur provided the B block plus plasticizer constitutes the major portion of the block polymer plus plasticizer. If the B block constitutes only 25% of the polymer and a relatively low level of plasticizer is added (say 25 parts per 100 of polymer) then the total of B block and plasticizer will only constitute 50 parts of the total of 125 plasticizer and thus normally the B block plus plasticizer will not constitute the continuous phase and a brittle product will result.

The following are specific embodiments of the instant invention.

GENERAL POLYMERIZATION PROCEDURE AND POLYMER CHARACTERIZATION

Polymerizations in all cases were effected in an all glass, dry polymerization unit under an atmosphere of nitrogen. Solvents and monomers were purified and were distilled from drying agents under nitrogen into receivers from which they were charged into the polymerization vessel. The polymerization initiator in all cases was n-butyllithium. The n-butyllithium was charged as a heptane solution of known concentration (approx. 0.1 Molar) from a reservoir by means of a burette to the polymerization vessel. The order of charge was (1) solvent, (2) n-butyllithium solution, and (3) monomer(s).

The overall molecular weight of the copolymer can be calculated from the expression $$\text{M.W.} = \frac{\text{Moles Monomer A}}{\text{Moles Butyllithium}} \times \text{Molecular Weight Monomer A}$$
$$+ \frac{\text{Moles Monomer B}}{\text{Moles Butyllithium}} \times \text{Molecular Weight Monomer B}$$
$$+ \ldots \ldots$$

This expression is an accurate representation of the molecular weight when the solvent, monomers, and polymerization system are very clean, i.e., low in impurities which might react with the butyllithium or the growing chain end. In some cases impurities reduce the amount of catalyst taking part in the polymerization and it is necessary to determine the amount of active carbon-bound lithium at the end of the polymerization in order to calculate an accurate molecular weight. This can be determined as follows: at the end of the polymerization allyl bromide is added to terminate all growing chains, and the resultant polymer solution is titrated for residual base. From the concentration of the residual base and the known initial concentration of n-butyllithium, the carbon-bound lithium at the end of the polymerization (terminal carbon-bound lithium) is known.

The polymers were isolated by precipitation with methanol in a Waring blender. The finely divided polymer was filtered, thoroughly washed with methanol, and dried in vacuo for 18–24 hours at 60°C.

The polymers produced were analyzed with a Waters Gel Permeation Chromatograph and with a Differential Scanning Calorimeter. For homopolymers, the Gel Permeation Chromatograph (GPC) provides, with a suitably calibrated column, measures of average molecular weights— number average ($M_n$), weight average ($M_w$), and higher average molecular weights. The ratio of $M_w/M_n$ provides from some measure of molecular weight distribution. With block copolymers GPC does not provide for direct measure of molecular weight but does provide information on whether homopolymers are present and on narrowness of molecular weight distribution.

Differential scanning calorimetry (DSC) of amorphous polymers provides the temperature or temperature range where transitions are occurring, notably the glass transition temperature which is the temperature through which an amorphous polymer goes from a hard glass to a liquid. Mixtures of 2 homopolymers that are different and incompatible with each other will result in DSC transitions corresponding to the glass transition temperatures of both homopolymers. If the homopolymers are totally compatible, the glass transitions of the homopolymers are expected to be absent and a broader intermediate transition temperature is expected. Thus, with block copolymers and mixtures of homopolymers, DSC gives information on the presence of separate phases.

Similarly, thermomechanical analysis (TMA) can be used to detect these transitions in copolymers by measuring stiffness or modulus as a function of temperature.

EXAMPLE 1

A terblock copolymer of styrene and t-butyl styrene (TBS) was prepared as follows: 350 ml benzene and 0.502 mmole n-butyllithium were charged, heated to 40°C. and 10.3 g (0.099 mole) of styrene added. The solution was stirred for 35 minutes at 40°–60°C. and then 48.0 g t-butyl styrene (0.299 mole) was added. Stirring was continued 60 minutes at 60°–65°C. and then 10.7 g (0.102 mole) styrene added. Stirring was continued 30 minutes at 50°–60°C., the polymer solution was analyzed, and the terblock copolymer isolated. Terminal carbon-bound lithium = 0.337 mmole. Recovered copolymer = 68.1 g. Copolymer composition — 30 weight % styrene. Calculated $M_n$ = 170,000. Calculated average copolymer chain composition = 30,000 polystyrene — 109,000 poly-t-butyl styrene - 31,000 polystyrene.

GPC showed the terblock copolymer to be essentially devoid of homopolymer and diblock copolymers and to possess a narrow molecular weight distribution ($M_w/M_n$ = 1.48).

Molded specimens of this terblock copolymer were clear and yet DSC showed thermal transitions at 380°K and 419°K.

These data show that a three block styrene-t-butylstyrene-styrene copolymer of this composition possesses separate polystyrene and poly-t-butylstyrene phases to a significant extent, but the dispersed phase exists as a high concentration of very small domains.

EXAMPLE 2

A triblock copolymer of styrene and t-butyl styrene was prepared as follows: 1000 ml of benzene and 1.04 meq. of n-butyllithium were charged to a reactor and 29.3 g (0.281 mole) styrene added. The solution was stirred at 20°C. for 30 minutes and 141.5 g (0.883 mole) t-butyl styrene added. The solution was stirred for 30 minutes at 14°C. and finally 29.4 g (0.282 mole) styrene was added. The solution was stirred for 30 minutes at 20°C., and the polymerization was terminated with methanol. The block copolymer was precipitated with methanol in a Waring blender. The copolymer was dried in a vacuum over at 80°C. Yield = 199 g. Composition of block copolymer: 14.6 wt. % styrene- 70.7 wt. %, t-butyl styrene 14.7 wt. % styrene. Overall degree of polymerization of the block copolymer is greater than 1385. The copolymer has a styrene-TBS-styrene sequence.

This block copolymer was rigid and brittle. GPC of the block copolymer showed it to be substantially all 3-block and to have a narrow molecular weight distribution. The copolymer was transparent but exhibited two separate glass transition temperatures at 377°K and 420°K corresponding to the glass transition temperatures of polystyrene and poly-t-butylstyrene.

The block copolymer was mixed with from 2 to 200 parts of Primol D and Flexon 845 per 100 of the block copolymer. Primol D is a white oil having an average molecular weight of about 500 by vapor pressure osmometry. It is based on paraffinic and naphthenic hydrocarbons and has a specific gravity of 0.885, measured at 15.6°C.; a kinematic viscosity measured at 20°C. of 240 centistokes; and a refractive index at 20°C. of 1.4823.

Flexon 845 is an oil consisting of about 15% aromatics and about 84% saturates, which has a refractive index at 20°C. of 1.4755, a specific gravity at 60°F. of 0.8649, and a viscosity at 100°F. of 31.9 centistokes. Flexible or rubbery products with good strength were obtained even at levels of oil as high as 180 parts per 100 of copolymer.

This demonstrates that the solubility parameter difference between polystyrene (9.1) and poly-t-butylstyrene (8.1 - calculated) is sufficient to maintain phase separation in the plasticized products and thereby to provide for good physical properties as a consequence of the phase separation.

EXAMPLE 3

According to the procedures described in Example 1, a styrene-TBS-styrene block copolymer was prepared having the composition 24.7 wt. % styrene-50.4 wt. % TBS-24.9 wt. % styrene. The copolymer had an overall degree of polymerization of at least 1400.

This copolymer also was hard and brittle. GPC showed it to be essentially 3-block and to possess a narrow molecular weight distribution. The copolymer was transparent but possessed two separate glass transition temperatures corresponding to the glass transition temperatures of polystyrene and poly-t-butylstyrene.

EXAMPLE 4

The block copolymer of this example was prepared according to procedures given in Example 1. As in Example 2, it also was composed of 50 wt. % TBS, but in this example the block order was reversed, i.e., a TBS-styrene-TBS block copolymer was prepared with the following composition: 25 wt. % TBS-50 wt. % styrene-25 wt. % TBS. The copolymer had an overall degree of polymerization of at least 1396.

This copolymer was hard and brittle. GPC showed it to be substantially 3-block and to possess a narrow molecular weight distribution. The copolymer was transparent but possessed two separate glass transition temperatures corresponding to polystyrene and poly-t-butyl styrene.

This example demonstrates that terblock copolymers with polystyrene end blocks and a poly-t-butylstyrene middle block possess two incompatible phases.

EXAMPLE 5

According to the procedures described in Example 1, a styrene-TBS-styrene block copolymer was prepared having the composition 35 wt. % styrene-30 wt. %

TBS-35 wt. % styrene. The copolylmer had an overall degree of polymerization of at least 1401.

The copolymer was hard and brittle. GPC showed it to be essentially a 3-block and to possess a narrow molecular weight distribution. The copolymer was transparent but possessed two separate glass transitions corresponding to polystyrene and poly-t-butylstyrene.

EXAMPLE 6

According to the procedures described in Example 1 a 19.7 wt. % styrene-60.6 wt. % t-butylstyrene-19.7 wt. % styrene terblock copolymer was prepared. The copolymer had an overall degree of polymerization of at least 1403 and was hard and brittle. Compression molded specimens were clear and transparent. GPC showed the block copolymer to be essentially 3-block and to possess a narrow molecular weight distribution.

EXAMPLE 7

A sample of a t-butylstyrene-styrene-t butylstyrene (TBS-S-TBS) block copolymer of the A-B-A type was prepared as follows. A one liter flask was oven dried, attached to a vacuum line and evacuated to 0.2 mm mercury pressure for 20 min. at about 150°C. to effectively remove trace amounts of moisture. The flask was cooled and 500 ml of pure dry benzene was added. To the benzene was added 14.89 ml of 0.1344 Normal - n-butyllithium in heptane. The reaction temperature was maintained at about 50°C., and 35.5 grams of purified dry t-butylstyrene was added to the solution. The colorless solution quickly turned bright orange and the temperature rose to 5° to 10°C. due to the heat of polymerization. The reaction was permitted to stir for 30 min. at 65°C. The reaction vessel was then cooled to about 50°C. and 163.1 gms of styrene was added and stirring was effected for 45 min. Some cooling of the reaction flask was necessary to prevent overheating of the reaction. Then 35.4 grams of t-butylstyrene was added at 60°C. and the entire contents were stirred at 60° to 70°C. for 40 min. The contents of the flask were then precipitated in methanol (a large excess of several liters), ground up in a high speed blender, filtered, and dried in a vacuum oven at 80°C. overnight. The final yield was 234 grams, which is about quantitative. The number average molecular weight of the final polymer chain is estimated to be 116,700. The first t-butylstyrene block is estimated to be 17,700 in number average molecular weight, and center styrene block is estimated to be 81,400 in number average molecular weight, and the third block of t-butylstyrene is estimated to be 17,600 in number average molecular weight. The softening points in the blocks of these polymers are somewhat dependent on the method of measuring. Using a duPont Thermo Mechanical Analyzer (TMA) 2 softening points were observed with this polymer, one near 100°C. for the polystyrene block, and one near 140°C. for the poly t-butylstyrene block. (Heating rate of 10°C./min. with 5 gram weight on probe.) The softening point of high molecular weight polystyrene homopolymer is estimated to be 100° to 110°C., while for poly t-butylstyrene homopolymer the softening point is estimated at 140° to 150°C. Gel permeation chromatography demonstrated the essential absence of either homopolymer or diblock polymers.

EXAMPLE 8

Using the same procedure outlined in Example 7, 11.14 ml of 0.1108 N - n-butyllithium was added to 1000 ml benzene followed by 69.7 gms styrene which was polymerized, followed by 60.1 gms t-butylstyrene which was polymerized, followed by 70.1 gms styrene which was polymerized. The reaction mixture was worked up as above. The various block molecular weights were estimated at 55,700, 48,100, and 56,500 and the number average molecular weight of the product was estimated at 160,300. The intrinsic viscosity in toluene at 25°C. was 0.68. The final styrene composition was about 70% distributed equally at the ends of the polymer molecule, and 30% t-butylstyrene as the center block. Gel permeation chromatography demonstrated the essential absence of either homopolymer or diblock copolymer.

EXAMPLE 9

A three-block copolymer of polystyrene and polyvinyl toluene was prepared according to the experimental procedure described in Example 2. Compression molded specimens were clear and transparent. GPC showed the block copolymer to be essentially 3-block and to possess a narrow molecular weight distribution. The center block was 70 wt. % polyvinyl toluene and the end blocks were each 15 wt. % polystyrene. The solubility parameter of polyvinyl toluene is 8.85 and that for polystyrene is 9.1. When this block copolymer was mixed with Primol D (solubility parameter = 7.3) at levels of from 60 to 140 parts of plasticizer per 100 of copolymer, only milky, brittle and exuding products were obtained showing that neither phase was plasticized.

When 100 parts of dibutyl phthalate (solubility parameter = 9.3) per 100 of the copolymer was added, the resulting product was a clear, tacky material possessing essentially no strength. In this instance, the plasticizer solvated both the polyvinyl toluene phase and the polystyrene phase to produce a one-phase system devoid of the physical properties derived from multiphase systems.

This example shows that the polymer blocks must be substantially different in solubility parameter to permit the maintenance of two phases (and therefore good physical properties) in the plasticized compositions.

EXAMPLE 10

A block copolymer of polyvinyl toluene and poly-t-butylstyrene was prepared according to the experimental procedure described in Example 2. The center block of this three-block copolymer was poly-t-butylstyrene and comprised 70 weight % of the polymer while the end blocks constituted 15 weight % each of polyvinyl toluene. Compression molded samples were clear and transparent. GPC showed the copolymer to be essentially three-block and to possess a narrow molecular weight distribution.

The block copolymer was mixed with from 60 to 140 parts Primol D per 100 of the copolymer. The plasticized compositions were flexible and possessed tensile strengths of from 370 to 1100 psi and elongations of from 265 to 540%. The Primol D with its solubility parameter of 7.3 selectively solvates the poly-t-butylstyrene phase (solubility parameter 8.1) while not affecting the polyvinyl toluene phase (solubility parameter = 8.85).

This example demonstrates that block copolymers consisting of poly-t-butylstyrene blocks and polyvinyl toluene blocks are sufficiently phase separated to provide for plasticized compositions with excellent proper-

What is claimed is:

1. Thermoplastic copolymers wherein said copolymer is selected from the group consisting of block copolymers having the general formulae (I) A—B—A, (II) A—B—A—B—A and (III) xB—[A—B]$_n$—yA, and graft copolymers having the general formula (IV)

wherein $m$ and $n$ are integers greater than or equal to 2; $x$ and $y$ are 0 or 1, and $y$ is 0 when $n$ is 2; and A and B are mutually incompatible vinyl aromatic polymer blocks having a solubility parameter difference of greater than 0.7.

2. The composition of claim 1 wherein said vinyl aromatic polymer blocks have the molecular weight of at least 5,000.

3. The composition of claim 2 wherein said vinyl aromatic polymer blocks have glass transition temperatures of at least 35°C.

4. The composition of claim 3 wherein A and B are selected from the group consisting of styrene and alkyl styrenes.

5. The composition of claim 4 wherein said alkyl styrene is derived from monomers selected from the group consisting of compounds having the general formula

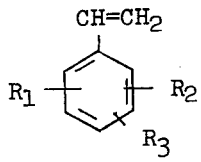

wherein $R_1$, $R_2$ and $R_3$ are selected from the group consisting of hydrogens or alkyl groups.

6. The composition of claim 5 wherein said alkyl groups are selected from the group consisting of methyl, ethyl, isopropyl and t-butyl groups.

7. The composition of claim 5 wherein $R_2$ and $R_3$ are hydrogen, and $R_1$ is a $C_3$ to $C_{10}$ alkyl group.

8. The composition of claim 7 wherein A is styrene and B is t-butyl styrene.

9. The composition of claim 4 wherein A and B are selected from the group consisting of α-methyl styrene and alkyl styrenes.

10. The composition of claim 9 wherein said alkyl styrene is derived from monomers selected from the group consisting of compounds having the general formula

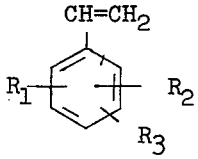

wherein $R_1$, $R_2$ and $R_3$ are selected from the group consisting of hydrogens or alkyl groups.

11. The composition of claim 10 wherein said alkyl groups are selected from the group consisting of methyl, ethyl, isopropyl and t-butyl groups.

12. The composition of claim 1 wherein said B block comprises from 50 to 95 weight % of the total polymer.

13. The composition of claim 1 wherein said solubility parameter difference is greater than 1.0.

14. The composition of claim 4 wherein said B block will comprise from 50 to 95% by weight of said thermoplastic block copolymer.

15. The composition of claim 4 wherein the amount of A-B diblock impurity is less than 10% by weight.

16. The composition of claim 4 wherein said total amount of homopolymer and diblock impurity is less than 10% by weight.

17. Thermoplastic copolymers wherein said copolymer is selected from the group consisting of block copolymers having the general formula A—B—A wherein A and B are mutually incompatible vinyl aromatic polymer blocks having a solubility parameter difference of greater than 0.7.

18. The composition of claim 17 wherein said vinyl aromatic polymer blocks have the molecular weight of at least 5,000.

19. The composition of claim 18 wherein said vinyl aromatic polymer blocks have glass transition temperatures of at least 35°C.

20. The composition of claim 19 wherein said vinyl aromatic polymer blocks have glass transition temperatures of at least 50°C.

21. The composition of claim 17 wherein said B block comprises from 50 to 80% by weight of the total polymer.

22. The composition of claim 21 wherein A is styrene and B is t-butyl styrene.

23. The composition of claim 21 wherein A is t-butyl styrene and B is styrene.

24. The composition of claim 21 wherein A is vinyl toluene and B is t-butyl styrene.

25. The composition of claim 21 wherein A is t-butyl styrene and B is vinyl toluene.

26. The composition of claim 19 wherein A and B are selected from the group consisting of styrene and alkyl styrenes.

27. The composition of claim 19 wherein A is vinyl toluene and B is selected from the group consisting of alkyl styrenes having the formula

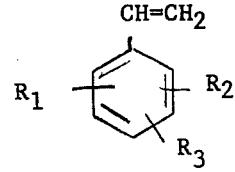

wherein $R_1$ is a $C_3$ to $C_{10}$ alkyl group and $R_2$ and $R_3$ are hydrogen.

* * * * *